United States Patent [19]

Kreft et al.

[11] 4,127,406
[45] Nov. 28, 1978

[54] PROCESS FOR THE HEAT TREATMENT OF FINE MATERIAL

[75] Inventors: Wilfried Kreft, Beckum; Wolf Goldmann, Neubeckum, both of Germany

[73] Assignee: Polysius AG, Neubeckum, Germany

[21] Appl. No.: 800,207

[22] Filed: May 25, 1977

[30] Foreign Application Priority Data

Jun. 29, 1976 [DE] Fed. Rep. of Germany ....... 2629082

[51] Int. Cl.² .................... C22B 1/10; C01F 7/00
[52] U.S. Cl. ..................................... 75/26; 75/91; 423/625; 423/1; 423/659; 423/175; 106/100; 432/14; 432/15
[58] Field of Search ................ 423/625, 1; 110/22 A; 75/26, 91; 432/14, 15

[56] References Cited

U.S. PATENT DOCUMENTS

| 1,969,371 | 8/1934 | Hawley | 110/22 A |
| 3,265,465 | 8/1966 | Turpin | 423/625 |
| 3,336,109 | 8/1967 | Du Bellay et al. | 423/625 |
| 3,579,616 | 5/1971 | Reh et al. | 423/625 |

FOREIGN PATENT DOCUMENTS

1,807,292  0000  Fed. Rep. of Germany ........... 423/659

*Primary Examiner*—Herbert T. Carter
*Attorney, Agent, or Firm*—Marshall & Yeasting

[57] ABSTRACT

Fine solid material is preheated in a first zone, then heated to the final treatment temperature by passing it through a flame in a second zone, and then separated in a third zone from the hot exhaust gases leaving the second zone. The separated exhaust gases are led to the first zone for preheating the material. A fuel feed stock is gasified to produce a combustible gas, and such gas is burned in the second zone to produce said flame.

5 Claims, 1 Drawing Figure

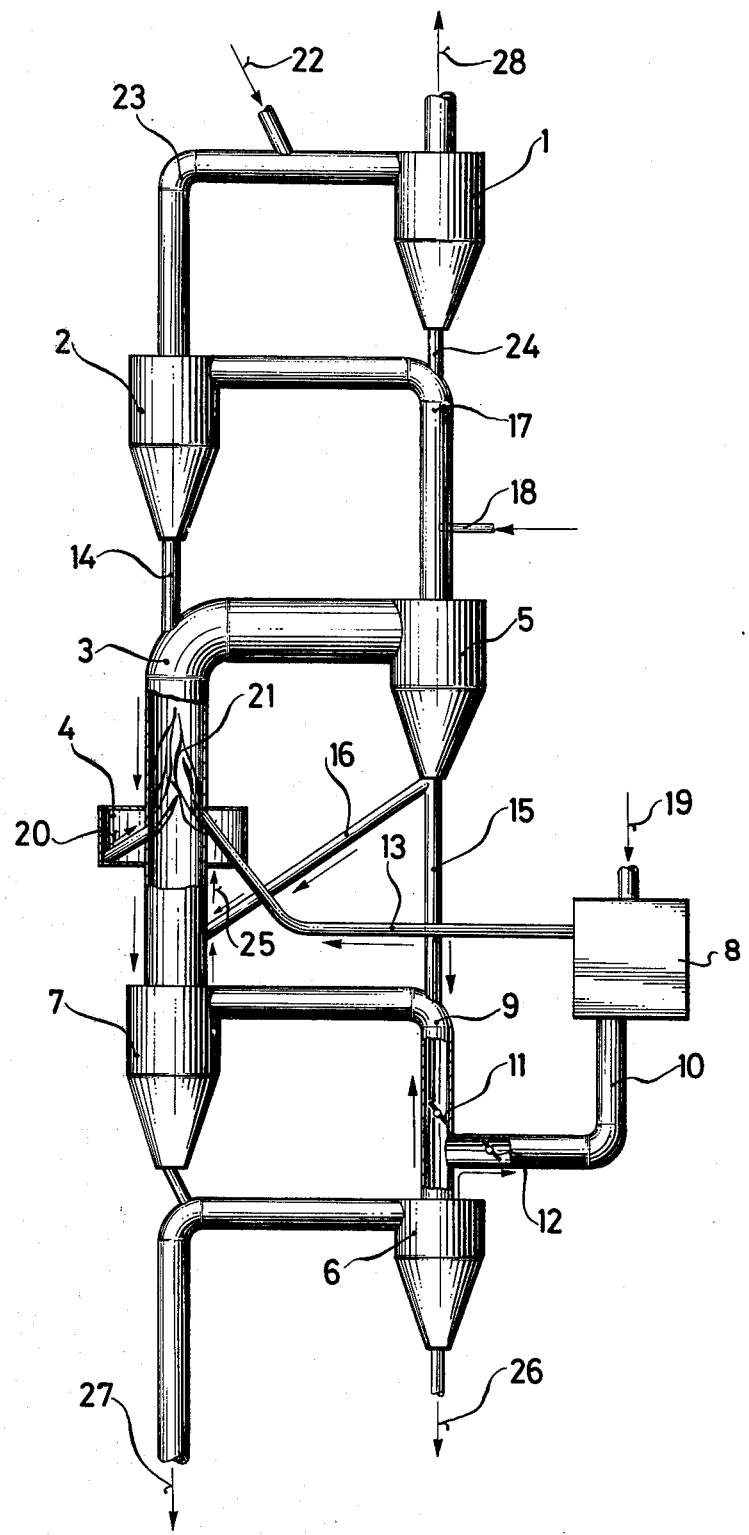

PROCESS FOR THE HEAT TREATMENT OF FINE MATERIAL

BACKGROUND OF THE INVENTION

This invention relates to a process and an apparatus for the heat-treatment of fine material which is first preheated in a first zone, subsequently heated in a second zone to the final treatment temperature by passing through a flame, and then separated in a third zone from the hot exhaust gases of the second zone, the hot exhaust gases from the second zone being used for preheating the material in the first zone.

One such process is known for example from our German Pat. No. 1,807,292. This process enables fine material to be calcined at high temperatures in a gas stream over a short distance and, hence, provides for high throughput levels through a calcining or sintering chamber of very simple construction, i.e. with little construction outlay. The most important requirement for uniformly heat-treating all the particles of fine material is that uniformly pre-heated fine material should pass through the zone of highest temperature in a precisely defined, short space of time.

This process has proved to be eminently suitable for heat treating various types of fine material, for example for calcining or sintering cement raw material, lime, dolomite, magnesite, hydrate of alumina, etc. Hitherto, gaseous fuels have been used for the heat treatment in the second zone (i.e. in the high temperature zone).

The object of the present invention is further to develop the process described above to the extent that solid or liquid fuel may also be used for generating the heat required in the second zone.

In the experiments on which the present invention is based, solid or liquid fuel was first directly used in the second zone for producing the flame. It was found that solid or liquid fuel particles frequently settled on the particles of fine material, or were partially absorbed by the particles of fine material (oil droplets for example were sucked up) and, hence, became inaccessible to rapid combustion. The result of this was a relatively high carbon content in the end product which, in many cases (for example in the calcination of alumina hydrate), is undesirable.

If, in the second zone, the fine material passes through a flame produced by solid or liquid fuel and if solid or liquid fuel particles settle on the particles of fine material, the fuel is, in addition, actually burnt to a large extent on the particles of fine material themselves, which results in coking and soot formation and, in many cases, leads to over-calcination of the particles of fine material and to a corresponding reduction in product quality. In some cases, the fine material to be heat-treated even has a catalytic effect upon the cracking process taking place during the combustion of solid or liquid fuel, which promotes coking and, hence, the undesirable increase in the carbon content of the end product.

According to the invention, these disadvantages are obviated by virtue of the fact that the solid or liquid fuel is first gasified or vaporised and the combustible gases formed are used for producing the flame through which the fine material passes in the second zone (high temperature zone). In this way, the fine material is heat treated very uniformly over a short reaction zone, giving an end product of desirably low carbon content. The solid fuel may be gasified or the liquid fuel vaporised by any known process (using externally supplied heat or internally generated heat). Steam may also be used in a known manner for gasifying or vaporisation.

If, after separation, in a third zone from the hot exhaust gases of the second zone, the fine material is cooled in a fourth zone, it is preferable, in order to improve the heat economy of the process as a whole, to use waste air from the cooling zone for vaporising or gasifying the fuel.

As can be seen from the foregoing, the process according to the invention may be used with particular advantage in cases where the end product is not to exceed a certain carbon content, for example in the calcination of alumina hydrate.

However, the process according to the invention may also be used for example in the reduction of finely particulate ore, in which case a deficiency of air sufficient for the reduction process is provided in the second zone (high temperature zone).

In one practical embodiment of the process according to the invention, an adjustable portion of the material separated in the third zone from the hot exhaust gases of the second zone is returned to the second zone where it passes through the flame again. In this way, the individual particles of fine material (on a statistical average) pass repeatedly through the calcining or sintering zone, which further improves the uniformity of the end product. In this respect, it can also be of advantage for the second zone to contain several stages each equipped with a burner through which the fine material successively passes.

BRIEF DESCRIPTION OF THE DRAWING

The drawing is a diagram of an installation for carrying out the process according to the invention.

DESCRIPTION OF THE PREFERRED EMBODIMENT

The installation illustrated is intended for example for the calcination of alumina hydrate and uses heavy fuel oil as fuel.

The installation contains a first zone, consisting of the cyclones 1 and 2, for preheating the fine material. The second zone in which the material is heated to the final treatment temperature essentially comprises a burner tube 3 with a ring burner 4. The material is separated from the hot exhaust gases of the second zone in a cyclone 5 which forms the third zone. A fourth zone (cooling zone) consists of the cyclones 6 and 7. The installation further includes means 8 for vaporising the liquid fuel.

The connection of the above-mentioned parts of the installation by gas pipes and material pipes is shown in the drawing. The cooling air pipe 9 connecting the two cyclones 6 and 7 of the cooling zone is connected through a branch pipe 10 to the means 8 for vaporising the fuel. Adjusting means 11, 12 are provided in the two above-mentioned pipes 9 and 10 for adjusting the amounts of cooling air which are delivered from the cyclone 6 on the one hand through the pipe 9 to the cyclone 7 and on the other hand through the pipe 10 to the vaporising means 8.

The means 8 for vaporising the fuel communicates through a pipe 13 with the ring burner 4. In addition, the material discharge pipe 14 of the cyclone 2 opens into the burner tube 3 which is connected at its lower end to the waste air connection of the cyclone 7. On the exhaust gas side the burner tube 3 opens into the cyclone 5.

A first material discharge pipe 15 leads from the cyclone 5 to the pipe 9 which connects the cyclone 6 of the cooling zone to the cyclone 7. Another material discharge pipe 16 leads from the cyclone 5 to the burner tube 3. Distributing means (not shown in the drawing) enable the amounts of material entering the pipes 15 and 16 to be adjusted in any required ratio.

The gas pipe 17 leading from the cyclone 5 to the cyclone 2 is provided with an additional burner 18.

The installation illustrated in the drawing operates as follows:

Liquid fuel is delivered at 19 to the vaporising means 8 which, at the same time, receives heated exhaust air through the pipe 10. The fuel is thus vaporised. The gases formed flow through the pipe 13 to the ringburner 4 to which primary air may also be added at 20. In this way, there is produced in the burner tube 3 a flame 21 to which exhaust air flows as secondary air from the cyclone 7.

The fine material, for example alumina hydrate, is introduced at 22 into the pipe 23 leading from the cyclone 2 to the cyclone 1, enters the cyclone 1 in known manner with the exhaust gases from the cyclone 2, and is deposited in the cyclone 1 and introduced through the material discharge pipe 24 into the pipe 17. The gas stream in this pipe 17 is heated by the burner 18. The fine material thus preheated in the cyclones 1 and 2 and the associated gas pipes passes through the material discharge pipe 14 into the burner tube 3 where it is entrained upwards by the ascending gas stream (arrow 25) and passes through the flame 21 in a defined, short space of time. After separation in the cyclone 5, part of the fine material re-enters the burner tube 3 through the pipe 16, whilst the rest of the fine material passes through the pipe 15 into the cooling zone. In the cooling zone, the fine material passes successively through the cyclones 7 and 6 and is finally removed from the installation at 26. The cooling air is introduced at 27. The exhaust gases leave the installation at 28.

We claim:

1. In a process of heat-treating fine-grained solid material, comprising the steps of preheating the material in a first zone, then heating the material to the final treatment temperature by passing it through a flame in a second zone, wherein solid or liquid fuel is directly used to produce the flame, then separating the material in a third zone from the hot exhaust gases leaving the second zone, and conducting the separated exhaust gases to the first zone for preheating the material, wherein the product has a high carbon content, the improvement comprising the steps of gasifying said solid or liquid fuel in a separate gasifying zone to produce a combustible gas, supplying said combustible gas to the second zone and burning such gas in the second zone to produce said flame, whereby a low carbon content product is produced.

2. A process according to claim 1 comprising the steps of cooling the separated material in a stream of air in a fourth zone, and using air exhausted from the fourth zone for gasifying said fuel.

3. A process according to claim 1 for calcining aluminum hydrate to produce a product having a low carbon content.

4. A process according to claim 1 for reduction of a finely divided ore, wherein the supply of air to the second zone is maintained low enough to produce a reducing atmosphere in said zone.

5. A process according to claim 1, comprising the step of recycling to the second zone a controlled proportion of the material separated in the third zone.

* * * * *